US011444330B2

(12) United States Patent
Wen et al.

(10) Patent No.: US 11,444,330 B2
(45) Date of Patent: Sep. 13, 2022

(54) ELECTROLYTIC SOLUTION AND ELECTROCHEMICAL DEVICE USING THE SAME

(71) Applicant: NINGDE AMPEREX TECHNOLOGY LIMITED, Ningde (CN)

(72) Inventors: Qian Wen, Ningde (CN); Bin Wang, Ningde (CN); Xiexue Peng, Ningde (CN); Jianming Zheng, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 274 days.

(21) Appl. No.: 16/652,593

(22) PCT Filed: Mar. 30, 2020

(86) PCT No.: PCT/CN2020/082188
§ 371 (c)(1),
(2) Date: Mar. 31, 2020

(87) PCT Pub. No.: WO2020/233234
PCT Pub. Date: Nov. 26, 2020

(65) Prior Publication Data
US 2021/0408604 A1 Dec. 30, 2021

(30) Foreign Application Priority Data
May 23, 2019 (CN) .......................... 201910432578.7

(51) Int. Cl.
*H01M 10/0569* (2010.01)
*H01M 10/0567* (2010.01)
*H01M 10/0525* (2010.01)

(52) U.S. Cl.
CPC ... *H01M 10/0569* (2013.01); *H01M 10/0525* (2013.01); *H01M 10/0567* (2013.01); *H01M 2300/004* (2013.01); *H01M 2300/0034* (2013.01)

(58) Field of Classification Search
None
See application file for complete search history.

(56) References Cited

U.S. PATENT DOCUMENTS

| 2008/0102369 | A1 | 5/2008 | Sakata et al. |
| 2010/0062344 | A1 | 3/2010 | Koh et al. |
| 2011/0123872 | A1 | 5/2011 | Koh et al. |
| 2012/0315536 | A1 | 12/2012 | Bhat et al. |
| 2013/0095379 | A1* | 4/2013 | Kotato ............... H01M 10/056 429/200 |
| 2016/0020488 | A1* | 1/2016 | Cho ..................... C07D 213/57 429/188 |
| 2018/0219259 | A1* | 8/2018 | Kawai ..................... C07F 5/025 |
| 2019/0214680 | A1 | 7/2019 | Bo et al. |

FOREIGN PATENT DOCUMENTS

| CN | 101606266 | A | 12/2009 |
| CN | 103956517 | A | 7/2014 |
| CN | 104025353 | A | 9/2014 |
| CN | 104659417 | A | 5/2015 |
| CN | 105720304 | A | 6/2016 |
| CN | 106058319 | | * 10/2016 |
| CN | 106159324 | A | 11/2016 |
| CN | 108232300 | A | 6/2018 |
| CN | 109560323 | A | 4/2019 |
| CN | 110061293 | A | 7/2019 |
| JP | 2005044710 | A | 2/2005 |

OTHER PUBLICATIONS

CN106058319 English translation. Yang et al. China. Oct. 26, 2016 (Year: 2016).*
Tomooka et al. (N,O-bis(trifluoroacetyl)hydroxylamine as a Useful Electrophilic Nitrogen Source: Catalytic Synthesis of N-(Trifluoroacetyl)sulfilimines. California Institute of Technology. Organic Letters 1999 vol. 1, No. 1 149-151. (Year: 1999).*
PCT International Search Report, dated Jun. 30, 2020 in counterpart PCT application PCT/CN2020/082188, 6 pages in Chinese.
Chinese First Office Action dated Jul. 30, 2020 in counterpart Chinese application 201910432578.7, 8 pages in Chinese.

* cited by examiner

*Primary Examiner* — Christopher P Domone
(74) *Attorney, Agent, or Firm* — Juan Carlos A. Marquez; Marquez IP Law Office, PLLC

(57) ABSTRACT

The present application relates to an electrolytic solution and an electrochemical device using the same. The electrolytic solution comprises a cyclic fluorocarbonate, a chain fluorocarbonate and a fluoroether compound, wherein based on the weight of the electrolytic solution, the weight percentage of the cyclic fluorocarbonate is 15 wt % to 80 wt %. The electrolytic solution provided by the present application has high electric conductivity and good electrochemical stability and safety performance, can significantly improve the cycle performance of the battery, and especially meet the demand for long cycle life of a lithium metal battery, and has a very large application value in the lithium metal battery.

20 Claims, No Drawings

ELECTROLYTIC SOLUTION AND ELECTROCHEMICAL DEVICE USING THE SAME

CROSS REFERENCE TO RELATED APPLICATIONS

The present application is a National Stage application of PCT international application: PCT/CN2020/082188 which claims the benefit of priority from the China Patent Application No. 201910432578.7, filed on 23 May 2019, the disclosure of which is hereby incorporated by reference in its entirety.

BACKGROUND OF THE INVENTION

1. Technical Field

The present application relates to the technical field of electrochemical devices, and more particularly to an electrolytic solution and an electrochemical device using the same.

2. Description of the Related Art

Among the many kinds of electrochemical devices, lithium-ion batteries have become widely used due to their advantages, such as environmental friendliness, high operating voltage, large specific capacity and long cycle life. Lithium-ion batteries have become the new green chemical power source with the largest development potential in the world. Among lithium-ion batteries, soft pack batteries with small package thickness and light weight are favored by many people. Along with the development of the lithium-ion battery industry, people have put forward higher requirements for lithium-ion batteries: lighter and thinner, smaller, and with higher energy density. Lithium metal is the most ideal anode material, and the development of lithium metal batteries is crucial for improving the energy density of batteries.

Since lithium metal has the lowest chemical potential (−3.04 V) and has very high reactivity, the typical liquid electrolytic solution has high reactivity with lithium metal, and the solid electrolyte interface (SEI) film formed on the surface of electrodes is unstable, lithium metal batteries have very low coulombic efficiency during cycling, and lithium dendrites would pierce the separator, which would cause a short circuit and a safety risk.

Therefore, it is crucial to develop a liquid electrolytic solution which is suitable for an electrochemical device (for example, a lithium metal battery) to achieve a better long-cycle life and large-rate charge and discharge.

SUMMARY

The present application provides an electrolytic solution and an electrochemical device using the same in an attempt to solve at least one of the problems found in the related art at least to a certain degree.

According to some embodiments, the present application provides an electrolytic solution, which comprises a cyclic fluorocarbonate, a chain fluorocarbonate and a fluoroether compound, wherein based on the weight of the electrolytic solution, the weight percentage of the cyclic fluorocarbonate is about 15 wt % to about 80 wt %.

According to some embodiments, based on the weight of the electrolytic solution, the weight percentage of the cyclic fluorocarbonate is X, and the sum of the weight percentages of the chain fluorocarbonate and the fluoroether compound is Y, wherein X and Y meet the following condition: about $0.25 \leq Y/X \leq$ about 5.7.

According to some embodiments, X and Y meet the following condition: about $0.67 \leq Y/X \leq$ about 5.

According to some embodiments, based on the weight of the electrolytic solution, the weight percentage of the chain fluorocarbonate is about 5 wt % to about 70 wt %, and the weight percentage of the fluoroether compound is about 5 wt % to about 70 wt %.

According to some embodiments, the cyclic fluorocarbonate includes the compound of Formula I:

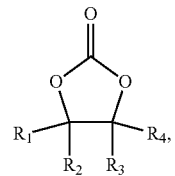

Formula I wherein $R_1$, $R_2$, $R_3$ and $R_4$ are each independently selected from hydrogen, a fluorine atom, an alkyl group having 1-12 carbon atoms, a fluoroalkyl group having 1-12 carbon atoms, a cycloalkyl group having 3-12 carbon atoms, a fluorocycloalkyl group having 3-12 carbon atoms, an alkenyl group having 2-12 carbon atoms, a fluoroalkenyl group having 2-12 carbon atoms, a heterocyclic group having 3-12 carbon atoms or a fluoroheterocyclic group having 3-12 carbon atoms, and wherein at least one of $R_1$, $R_2$, $R_3$ and $R_4$ is a fluorine atom, a fluoroalkyl group having 1-12 carbon atoms, a fluorocycloalkyl group having 3-12 carbon atoms, a fluoroalkenyl group having 2-10 carbon atoms or a fluoroheterocyclic group having 3-12 carbon atoms.

According to some embodiments, the cyclic fluorocarbonate includes at least one of the following compounds: fluoroethylene carbonate, 4,5-difluoroethylene carbonate or 4,4,5,5-tetrafluoroethylene carbonate.

According to some embodiments, the chain fluorocarbonate includes the compound of Formula II:

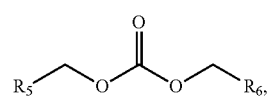

Formula II wherein $R_5$ and $R_6$ are each independently selected from hydrogen, a fluorine atom, an alkyl group having 1-12 carbon atoms, a fluoroalkyl group having 1-12 carbon atoms, an alkoxy group having 1-12 carbon atoms, a fluoroalkoxy group having 1-12 carbon atoms, an alkenyl group having 2-12 carbon atoms, a fluoroalkenyl group having 2-12 carbon atoms, an aryl group having 6-26 carbon atoms or a fluoroaryl group having 6-26 carbon atoms, and at least one of $R_5$ and $R_6$ is a fluoroalkyl group having 1-12 carbon atoms, a fluoroalkoxy group having 1-12 carbon atoms, a fluoroalkenyl group having 2-12 carbon atoms or a fluoroaryl group having 6-26 carbon atoms.

According to some embodiments, the chain fluorocarbonate includes at least one of the following compounds: methyl trifluoroethyl carbonate, methyl 2,2,3,3-tetrafluoropropyl carbonate or bis(2,2,2-trifluoroethyl) carbonate.

According to some embodiments, the fluoroether compound includes at least one of the compounds of Formula III, Formula IV, Formula V or Formula VI:

Rf1-O-Rf2    Formula III,

Rf1-O-R    Formula IV,

Rf1-O-(R'-O)$_n$-Rf2    Formula V,

Rf1-O-(R'-O)$_n$-R    Formula VI, wherein in Formulas III, IV, V and VI, Rf1 and Rf2 are each independently selected from a linear or branched fluoroalkyl group having 1-12 carbon atoms in which at least one hydrogen atom is replaced by a fluorine atom, R is a linear or branched alkyl group having 1-12 carbon atoms, R' is a linear or branched alkylene group having 1-5 carbon atoms, and n is an integer from 1 to 5.

According to some embodiments, the fluoroether compound includes at least one of the following compounds: $CF_3CH_2OCH_2CF_3$, $HCF_2CF_2OCH_2CF_3$, $HCF_2CF_2OCH_2CF_2CF_2H$, $(CF_3)_2CFCF(CF_2CF_3)(OCH_3)$, $CF_3CHFCF_2CH(CH_3)OCF_2CHFCF_3$, $HCF_2CF_2CH_2OCF_2CF_2CF_2H$, $HCF_2CF_2OCH_2CF_3$, $HCF_2CF_2OCH_2CH_2OCF_2CF_2H$, $HCF_2CF_2OCH_2CH_2CH_2OCF_2CF_2H$, $HCF_2CF_2CH_2OCF_2CF_2CF_2H$, $HCF_2CF_2OCH_2CH_2OCF_2CF_2CF_2H$, $HCF_2CF_2OCH_2CH_2CH_2OCF_2CF_2CF_2H$, $CH_3OCH_2CH_2OCH_2CH_2F$, $CH_3OCH_2CH_2OCH_2CF_3$, $CH_3OCH_2CH(CH_3)OCH_2CH_2F$, $CH_3OCH_2CH(CH_3)OCH_2CF_3$, $FCH_2CH_2OCH_2CH_2OCH_2CH_2F$, $FCH_2CH_2OCH_2CH(CH_3)OCH_2CH_2F$, $CF_3CH_2O(CH_2CH_2O)_2CH_2CF_3$ or $CF_3CH_2OCH_2CH(CH_3)OCH_2CF_3$.

According to some embodiments, the electrolytic solution further includes an additive, the additive including at least one of the following compounds: vinylethylene carbonate, lithium bis(oxalate)borate, lithium borate difluorooxalate, lithium tetrafluoroborate, methylene methanedisulfonate, ethylene 4-trifluoromethyl carbonate, 1,3,2-dioxathiolane-2,2-dioxide, fluoroethylene carbonate, ethylene sulfite, vinylene carbonate, butanedioic anhydride, propylene sulfite, propenyl 1,3-sultone, bis(trimethylsilyl) sulfate, lithium nitrate, N-butyl, methylpyrrolidinium bis((trifluoromethyl)sulfonyl)imide, n-propyl, methylpiperidinium bis((trifluoromethyl)sulfonyl)imide, 1,3-dioxane, 1,4-dioxane, 1,2-bis(cyanoethoxy)ethane, adiponitrile, fumaronitrile, succinonitrile, 1,3,5-pentanetricarbonitrile, 1,3,6-hexanetricarbonitrile, 1,2,3-tris(2-cyanoethoxy)propane or a fluoroacylhydroxylamine compound, wherein the fluoroacylhydroxylamine compound includes the compound of Formula VII:

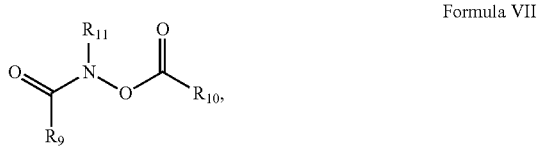

Formula VII wherein $R_9$ and $R_{10}$ are each independently selected from a hydrocarbyl group having 1-12 carbon atoms or a fluorohydrocarbyl group having 1-12 carbon atoms, $R_{11}$ is selected from hydrogen or a hydrocarbyl group having 1-6 carbon atoms, and at least one of $R_9$ and $R_{10}$ is a fluorohydrocarbyl group having 1-12 carbon atoms.

According to some embodiments, the fluoroacylhydroxylamine compound includes N,O-bis(trifluoroacetyl)hydroxylamine, N-methoxy-N-methyl-2,2,2-trifluoroacetamide or a combination thereof.

According to some embodiments, based on the weight of the electrolytic solution, the weight percentage of the additive is about 0.05 wt % to about 15 wt %.

Other embodiments of the present application provide an electrochemical device, wherein the electrochemical device includes the electrolytic solution of any of the above embodiments.

Other embodiments of the present application provide an electronic device, wherein the electronic device includes the electronic device of any of the above embodiments.

The electrolytic solution provided by the present application has high electric conductivity and good electrochemical stability and safety performance, can significantly improve the cycle performance of the electrochemical device and meet the demand of the lithium metal battery requiring a long cycle life, and has a very large application value in the electrochemical device, especially in the lithium metal battery.

Additional aspects and advantages of the embodiments of the present application will be described or shown in the following description or interpreted by implementing the embodiments of the present application.

DETAILED DESCRIPTION

Embodiments of the present application are described in detail below. The embodiments of the present application should not be construed as limiting the present application.

As used in the present application, the term "about" is used for describing and explaining minor variations. When being used in combination with an event or circumstance, the term may refer to an example in which the event or circumstance occurs precisely, and an example in which the event or circumstance occurs approximately. For example, when used in conjunction with a numerical value, the term "about" may refer to a variation range that is less than or equal to ±10% of the numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

In addition, amounts, ratios and other numerical values are sometimes presented herein in a range format. It should be appreciated that such range formats are for convenience and conciseness, and should be flexibly understood as comprising not only values explicitly specified to range constraints, but also all individual values or sub-ranges within the ranges, like explicitly specifying each value and each sub-range.

In the detailed description and the claims, a list of items connected by the term "one of" or similar terms may mean any of the listed items. For example, if items A and B are listed, the phrase "one of A and B" means only A or only B. In another example, if items A, B, and C are listed, the phrase "one of A, B and C" means only A; only B; or only C. The item A may include a single component or multiple components. The item B may include a single component or multiple components. The item C may include a single component or multiple components.

In the detailed description and the claims, a list of items connected by the term "at least one of" or similar terms may mean any combination of the listed items. For example, if items A and B are listed, the phrase "at least one of A and B" means only A; only B; or A and B. In another example, if items A, B and C are listed, the phrase "at least one of A, B and C" means only A; or only B; only C; A and B (excluding C); A and C (excluding B); B and C (excluding A); or all of A, B and C. The item A may include a single component or multiple components. The item B may include a single component or multiple components. The item C may include a single component or multiple components.

As used herein, the term "hydrocarbyl" covers alkyl, alkenyl and alkynyl. For example, the hydrocarbyl is intended to be a linear hydrocarbon structure having 1-20 carbon atoms. The "hydrocarbyl" is also intended to be a branched or cyclic hydrocarbon structure having 3 to 20 carbon atoms. When the hydrocarbyl having a specific carbon number is specified, it is intended to cover all geometric isomers having such carbon number. The hydrocarbyl herein may also be hydrocarbyl having 1-15 carbon atoms, hydrocarbyl having 1-10 carbon atoms, hydrocarbyl having 1-5 carbon atoms, hydrocarbyl having 5-20 carbon atoms, hydrocarbyl having 5-15 carbon atoms or hydrocarbyl having 5-10 carbon atoms. Additionally, the hydrocarbyl can be optionally substituted.

As used herein, the term "heterocyclic group" covers aromatic and non-aromatic cyclic groups. The heteroaromatic cyclic group also refers to a heteroaryl group. In some embodiments, the heteroaromatic cyclic group and the hetero-non-aromatic cyclic group are a heterocyclic group having 2-20 carbon atoms including at least one heteroatom, a heterocyclic group having 2-10 carbon atoms and a heterocyclic group having 2-6 carbon atoms, for example, morpholinyl, piperidinyl and pyrrolidinyl, and cyclic ethers such as tetrahydrofuran and tetrahydropyran. Additionally, the heterocyclic group can be optionally substituted.

As used herein, the term "heteroatom" covers O, S, P, N or B.

As used herein, the "alkyl" is intended to be a linear saturated hydrocarbon structure having 1-20 carbon atoms. The "alkyl" is also intended to be a branched or cyclic hydrocarbon structure having 3-20 carbon atoms. For example, the alkyl may be alkyl having 1-20 carbon atoms, alkyl having 1-10 carbon atoms, alkyl having 1-5 carbon atoms, alkyl having 5-20 carbon atoms, alkyl having 5-15 carbon atoms or alkyl having 5-10 carbon atoms. When an alkyl having a specific carbon number is specified, it is intended to cover all geometric isomers having that carbon number; therefore, for example, "butyl" means to include n-butyl, sec-butyl, isobutyl, tert-butyl and cyclobutyl; and "propyl" includes n-propyl, isopropyl and cyclopropyl. Examples of alkyl include, but are not limited to, methyl, ethyl, n-propyl, isopropyl, cyclopropyl, n-butyl, isobutyl, sec-butyl, tert-butyl, cyclobutyl, n-pentyl, isoamyl, neopentyl, cyclopentyl, methylcyclopentyl, ethylcyclopentyl, n-hexyl, isohexyl, cyclohexyl, n-heptyl, octyl, cyclopropyl, cyclobutyl and norbornyl. Additionally, the alkyl can be optionally substituted.

As used herein, the term "alkylene" covers linear and branched alkylene. For example, the alkylene may be alkylene having 1-20 carbon atoms, alkylene having 1-6 carbon atoms, alkylene having 2-6 carbon atoms or alkylene having 2-5 carbon atoms. Additionally, the alkylene can be optionally substituted.

As used herein, the term "aryl" covers both monocyclic and polycyclic systems. A polycyclic ring may have two or more rings in which two carbons are shared by two adjacent rings (the rings are "fused"), wherein at least one of the rings is aromatic, for example, other rings may be cycloalkyl, cycloalkenyl, aryl, heterocyclic and/or heteroaryl. For example, the aryl may be aryl having 6-20 carbon atoms or aryl having 6-10 carbon atoms. Representative aryl includes, for example, phenyl, methylphenyl, propylphenyl, isopropylphenyl, benzyl, naphthalen-1-yl and naphthalen-2-yl.

As used herein, the term "cycloalkyl" covers cyclic alkyl. For example, the cycloalkyl may be cycloalkyl having 3-20 carbon atoms, cycloalkyl having 3-15 carbon atoms, cycloalkyl having 3-10 carbon atoms, cycloalkyl having 3-6 carbon atoms, cycloalkyl having 5-20 carbon atoms, cycloalkyl having 5-15 carbon atoms or cycloalkyl having 5-10 carbon atoms. Additionally, the cycloalkyl can be optionally substituted.

As used herein, the term "alkenyl" refers to a monovalent unsaturated hydrocarbon group which may be linear or branched and which has at least one and usually 1, 2 or 3 carbon-carbon double bonds. Unless otherwise defined, the alkenyl typically contains 2-20 carbon atoms, for example alkenyl having 2-20 carbon atoms, alkenyl having 6-20 carbon atoms, alkenyl having 2-12 carbon atoms or alkenyl having 2-6 carbon atoms. A representative alkenyl includes, for example, ethenyl, n-propenyl, isopropenyl, n-but-2-enyl, but-3-enyl and n-hex-3-enyl. Additionally, the alkenyl can be optionally substituted.

As used herein, the "alkoxy" covers alkoxy having 1-20 carbon atoms, alkoxy having 1-10 carbon atoms, alkoxy having 1-5 carbon atoms, alkoxy having 5-20 carbon atoms, alkoxy having 5-15 carbon atoms or alkoxy having 5-10 carbon atoms. Additionally, the alkoxy can be optionally substituted.

When the above substituents are substituted, the substituents thereof may each independently be selected from the group consisting of halogen, alkyl, cyclohydrocarbyl, alkenyl or aryl.

As used herein, the term "halogen" covers F, Cl, Br or I.

I. Electrolytic Solution

Embodiments of the present application provide an electrolytic solution, which comprises a cyclic fluorocarbonate, a chain fluorocarbonate and a fluoroether compound, wherein based on the weight of the electrolytic solution, the weight percentage of the cyclic fluorocarbonate is about 15 wt % to about 80 wt %.

In some embodiments, based on the weight of the electrolytic solution, the weight percentage of the cyclic fluorocarbonate is about 20 wt % to about 80 wt %. In some embodiments, based on the weight of the electrolytic solution, the weight percentage of the cyclic fluorocarbonate is about 30 wt % to about 80 wt %. In some embodiments, based on the weight of the electrolytic solution, the weight percentage of the cyclic fluorocarbonate is about 40 wt % to about 80 wt %. In some embodiments, based on the weight of the electrolytic solution, the weight percentage of the cyclic fluorocarbonate is about 50 wt % to about 80 wt %. In some embodiments, based on the weight of the electrolytic solution, the weight percentage of the cyclic fluorocarbonate is about 60 wt % to about 80 wt %. In some embodiments, based on the weight of the electrolytic solution, the weight percentage of the cyclic fluorocarbonate is about 20 wt % to about 60 wt %. In some embodiments, based on the weight of the electrolytic solution, the weight percentage of the cyclic fluorocarbonate is about 30 wt % to about 50 wt %. In some embodiments, based on the weight of the electrolytic solution, the weight percentage of the cyclic fluorocarbonate is about 25 wt %, about 35 wt %, about 55 wt %, about 65 wt %, about 70 wt % or about 75 wt %.

In some embodiments, based on the weight of the electrolytic solution, the weight percentage of the cyclic fluorocarbonate is X, and the sum of the weight percentages of the chain fluorocarbonate and the fluoroether compound is Y, wherein X and Y meet the following condition: about $0.25 \leq Y/X \leq $ about $5.7$.

In some embodiments, X and Y meet the following condition: about $0.67 \leq Y/X \leq $ about 5. In some embodiments, X and Y meet the following condition: about $1 \leq Y/X \leq $ about 4. In some embodiments, X and Y meet the following condition: about $2 \leq Y/X \leq $ about 3.

In some embodiments, based on the weight of the electrolytic solution, the weight percentage of the chain fluorocarbonate is about 5 wt % to about 70 wt %. In some embodiments, based on the weight of the electrolytic solution, the weight percentage of the chain fluorocarbonate is about 10 wt % to about 60 wt %. In some embodiments, based on the weight of the electrolytic solution, the weight percentage of the chain fluorocarbonate is about 20 wt % to about 50 wt %. In some embodiments, based on the weight of the electrolytic solution, the weight percentage of the chain fluorocarbonate is about 30 wt % to about 40 wt %. In some embodiments, based on the weight of the electrolytic solution, the weight percentage of the chain fluorocarbonate is about 15 wt %, about 25 wt %, about 35 wt %, about 45 wt %, about 55 wt % or about 65 wt %.

In some embodiments, based on the weight of the electrolytic solution, the weight percentage of the fluoroether compound is about 5 wt % to about 70 wt %. In some embodiments, based on the weight of the electrolytic solution, the weight percentage of the fluoroether compound is about 5 wt % to about 60 wt %. In some embodiments, based on the weight of the electrolytic solution, the weight percentage of the fluoroether compound is about 5 wt % to about 50 wt %. In some embodiments, based on the weight of the electrolytic solution, the weight percentage of the fluoroether compound is about 5 wt % to about 40 wt %. In some embodiments, based on the weight of the electrolytic solution, the weight percentage of the fluoroether compound is about 5 wt % to about 20 wt %. In some embodiments, based on the weight of the electrolytic solution, the weight percentage of the fluoroether compound is about 10 wt % to about 20 wt %.

In some embodiments, the cyclic fluorocarbonate includes the compound of Formula I:

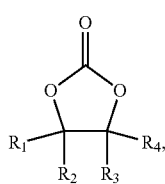

Formula I wherein $R_1$, $R_2$, $R_3$ and $R_4$ are each independently selected from hydrogen, a fluorine atom, an alkyl group having 1-20 carbon atoms, an alkyl group having 1-12 carbon atoms, an alkyl group having 1-6 carbon atoms, a fluoroalkyl group having 1-20 carbon atoms, a fluoroalkyl group having 1-12 carbon atoms, a fluoroalkyl group having 1-6 carbon atoms, a cycloalkyl group having 3-20 carbon atoms, a cycloalkyl group having 3-12 carbon atoms, a cycloalkyl group having 3-6 carbon atoms, a fluorocycloalkyl group having 3-20 carbon atoms, a fluorocycloalkyl group having 3-12 carbon atoms, a fluorocycloalkyl group having 3-6 carbon atoms, an alkenyl group having 2-20 carbon atoms, an alkenyl group having 2-12 carbon atoms, an alkenyl group having 2-6 carbon atoms, a fluoroalkenyl group having 2-20 carbon atoms, a fluoroalkenyl group having 2-12 carbon atoms, a fluoroalkenyl group having 2-6 carbon atoms, a heterocyclic group having 3-20 carbon atoms, a heterocyclic group having 3-12 carbon atoms, a heterocyclic group having 3-6 carbon atoms, a fluoroheterocyclic group having 3-20 carbon atoms, a fluoroheterocyclic group having 3-12 carbon atoms or a fluoroheterocyclic group having 3-6 carbon atoms, and wherein at least one of $R_1$, $R_2$, $R_3$ and $R_4$ is a fluorine atom, a fluoroalkyl group having 1-20 carbon atoms, a fluoroalkyl group having 1-12 carbon atoms, a fluoroalkyl group having 1-6 carbon atoms, a fluorocycloalkyl group having 3-20 carbon atoms, a fluorocycloalkyl group having 3-12 carbon atoms, a fluorocycloalkyl group having 3-6 carbon atoms, a fluoroalkenyl group having 2-20 carbon atoms, a fluoroalkenyl group having 2-12 carbon atoms, a fluoroalkenyl group having 2-6 carbon atoms, a fluoroheterocyclic group having 3-20 carbon atoms, a fluoroheterocyclic group having 3-12 carbon atoms or a fluoroheterocyclic group having 3-6 carbon atoms.

In some embodiments, the cyclic fluorocarbonate includes, but is not limited to, at least one of the following compounds: fluoroethylene carbonate, 4,5-difluoroethylene carbonate or 4,4,5,5-tetrafluoroethylene carbonate.

In some embodiments, the chain fluorocarbonate includes the compound of Formula II:

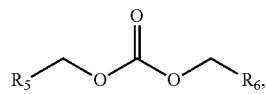

Formula II wherein $R_5$ and $R_6$ are each independently selected from hydrogen, a fluorine atom, an alkyl group having 1-20 carbon atoms, an alkyl group having 1-12 carbon atoms, an alkyl group having 1-6 carbon atoms, a fluoroalkyl group having 1-20 carbon atoms, a fluoroalkyl group having 1-12 carbon atoms, a fluoroalkyl group having 1-6 carbon atoms, an alkoxy group having 1-20 carbon atoms, an alkoxy group having 1-12 carbon atoms, an alkoxy group having 1-6 carbon atoms, a fluoroalkoxy group having 1-20 carbon atoms, a fluoroalkoxy group having 1-12 carbon atoms, a fluoroalkoxy group having 1-6 carbon atoms, an alkenyl group having 2-20 carbon atoms, an alkenyl group having 2-12 carbon atoms, an alkenyl group having 2-6 carbon atoms, a fluoroalkenyl group having 2-20 carbon atoms, a fluoroalkenyl group having 2-12 carbon atoms, a fluoroalkenyl group having 2-6 carbon atoms, an aryl group having 6-50 carbon atoms, an aryl group having 6-26 carbon atoms, an aryl group having 6-12 carbon atoms, a fluoroaryl group having 6-50 carbon atoms, a fluoroaryl group having 6-26 carbon atoms or a fluoroaryl group having 6-12 carbon atoms, and at least one of $R_5$ and $R_6$ is a fluoroalkyl group having 1-20 carbon atoms, a fluoroalkyl group having 1-12 carbon atoms, a fluoroalkyl group having 1-6 carbon atoms, a fluoroalkoxy group having 1-20 carbon atoms, a fluoroalkoxy group having 1-12 carbon atoms, a fluoroalkoxy group having 1-6 carbon atoms, a fluoroalkenyl group having 2-20 carbon atoms, a fluoroalkenyl group having 2-12 carbon atoms, a fluoroalkenyl group having 2-6 carbon atoms, a fluoroaryl group having 6-50 carbon atoms, a fluoroaryl group having 6-26 carbon atoms or a fluoroaryl group having 6-12 carbon atoms.

In some embodiments, the chain fluorocarbonate includes at least one of the following compounds: methyl trifluoroethyl carbonate, methyl 2,2,3,3-tetrafluoropropyl carbonate or bis(2,2,2-trifluoroethyl) carbonate.

In some embodiments, the fluoroether compound includes at least one of the compounds of Formula III, Formula IV, Formula V or Formula VI:

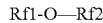　　　　　　　　　　Formula III,

　　　　　　　　　　Formula IV,

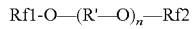　　　　　　　　　　Formula V,

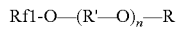　　　　　　　　　　Formula VI, wherein in Formulas III, IV, V and VI, Rf1 and Rf2 are each independently selected from a linear or branched fluoroalkyl group having 1-12 carbon atoms in which at least one hydrogen atom is replaced by a fluorine atom, R is a linear or branched alkyl group having 1-12 carbon atoms, R' is a linear or branched alkylene group having 1-5 carbon atoms, and n is an integer from 1 to 5.

In some embodiments, the fluoroether compound includes, but is not limited to, at least one of the following compounds: $CF_3CH_2OCH_2CF_3$, $HCF_2CF_2OCH_2CF_3$, $HCF_2CF_2OCH_2CF_2CF_2H$, $(CF_3)_2CFCF(CF_2CF_3)(OCH_3)$, $CF_3CHFCF_2CH(CH_3)OCF_2CHFCF_3$, $HCF_2CF_2CH_2OCF_2CF_2CF_2CF_2H$, $HCF_2CF_2OCH_2CF_3$, $HCF_2CF_2OCH_2CH_2OCF_2CF_2H$, $HCF_2CF_2OCH_2CH_2CH_2OCF_2CF_2H$, $HCF_2CF_2CH_2OCF_2CF_2H$, $HCF_2CF_2OCH_2CH_2OCF_2CF_2CF_2H$, $HCF_2CF_2OCH_2CH_2CH_2OCF_2CF_2CF_2H$, $CH_3OCH_2CH_2OCH_2CH_2F$, $CH_3OCH_2CH_2OCH_2CF_3$, $CH_3OCH_2CH(CH_3)OCH_2CH_2F$, $CH_3OCH_2CH(CH_3)OCH_2CF_3$, $FCH_2CH_2OCH_2CH_2OCH_2CH_2F$, $FCH_2CH_2OCH_2CH(CH_3)OCH_2CH_2F$, $CF_3CH_2O(CH_2CH_2O)_2CH_2CF_3$ or $CF_3CH_2OCH_2CH(CH_3)OCH_2CF_3$.

In some embodiments, the electrolytic solution further includes an additive, the additive including, but not limited to, at least one of the following compounds: vinylethylene carbonate, lithium bis(oxalate)borate, lithium borate difluoroxalate, lithium tetrafluoroborate, methylene methanedisulfonate, ethylene 4-trifluoromethyl carbonate, 1,3,2-dioxathiolane-2,2-dioxide, fluoroethylene carbonate, ethylene sulfite, vinylene carbonate, propylene sulfite, propenyl 1,3-sultone, bis(trimethylsilyl) sulfate, lithium nitrate, N-butyl, methylpyrrolidinium bis((trifluoromethyl)sulfonyl)imide, n-propyl, methylpiperidinium bis((trifluoromethyl)sulfonyl)imide, 1,3-dioxane, 1,4-dioxane, 1,2-bis(cyanoethoxy)ethane, adiponitrile, fumaronitrile, succinonitrile, 1,3,5-pentanetricarbonitrile, 1,3,6-hexanetricarbonitrile, 1,2,3-tris(2-cyanoethoxy)propane or a fluoroacylhydroxylamine compound, wherein the fluoroacylhydroxylamine compound includes the compound of Formula VII:

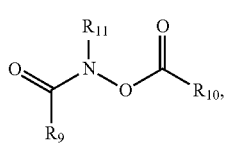　　　　　　　　　　Formula VII wherein $R_9$ and $R_{10}$ are each independently selected from a hydrocarbyl group having 1-20 carbon atoms, a hydrocarbyl group having 1-12 carbon atoms, a hydrocarbyl group having 1-6 carbon atoms, a fluorohydrocarbyl group having 1-20 carbon atoms, a fluorohydrocarbyl group having 1-12 carbon atoms or a fluorohydrocarbyl group having 1-6 carbon atoms, $R_{11}$ is selected from a hydrogen atom, a hydrocarbyl group having 1-20 carbon atoms, a hydrocarbyl group having 1-12 carbon atoms, or a hydrocarbyl group having 1-6 carbon atoms, and at least one of $R_9$ and $R_{10}$ is a fluorohydrocarbyl group having 1-20 carbon atoms, a fluorohydrocarbyl group having 1-12 carbon atoms or a fluorohydrocarbyl group having 1-6 carbon atoms.

In some embodiments, the fluoroacylhydroxylamine compound includes, but is not limited to, N,O-bis(trifluoroacetyl)hydroxylamine, N-methoxy-N-methyl-2,2,2-trifluoroacetamide or a combination thereof.

In some embodiments, the cyclic fluorocarbonate, the chain fluorocarbonate, and the fluoroether compound being used in combination with the above additive may further improve the cycle performance of the battery.

In some embodiments, based on the weight of the electrolytic solution, the weight percentage of the additive is about 0.05 wt % to about 15 wt %. In some embodiments, based on the weight of the electrolytic solution, the weight percentage of the additive is about 1 wt % to about 14 wt %. In some embodiments, based on the weight of the electrolytic solution, the weight percentage of the additive is about 1 wt % to about 13 wt %. In some embodiments, when the weight percentage of the above additive is within these ranges, the cycle performance of the battery can be further improved.

In some embodiments, the electrolytic solution may further include a carboxylic anhydride. In some embodiments, the type of the carboxylic anhydride is not particularly limited, that is, any of the carboxylic anhydride having a "C(=O)—O—C(=O) group" in the molecule is usable. In some embodiments, the carboxylic anhydride is selected from one or more of chain carboxylic anhydrides, such as acetic anhydride and propionic anhydride, and cyclic acid anhydrides such as succinic anhydride, fluorosuccinic anhydride, maleic anhydride, fluoromaleic anhydride, allylsuccinic anhydride, glutaric anhydride, fluoroitaconic anhydride and 3-sulfo-propionic anhydride.

In some embodiments, based on the weight of the electrolytic solution, the weight percentage of the carboxylic anhydride is about 0.05 wt % to about 15 wt %. In some embodiments, based on the weight of the electrolytic solution, the weight percentage of the carboxylic anhydride is about 1 wt % to about 4 wt %. In some embodiments, based on the weight of the electrolytic solution, the weight percentage of the carboxylic anhydride is about 1 wt % to about 3 wt %. In some embodiments, when the weight percentage of the above carboxylic anhydride is within these ranges, the cycle performance of the battery can be further improved.

In some embodiments, the electrolytic solution may further include a phosphazene compound. In some embodiments, the type of the phosphazene compound is not particularly limited, that is, any of the phosphazene compound having a "N=P—N group" in the molecule is usable. In some embodiments, the phosphazene compound is selected from at least one of methoxy pentafluorocyclotriphosphazene, ethoxy pentafluorocyclotriphosphazene, phenoxy pentafluorocyclotriphosphazene or ethoxy heptafluorocyclotetraphosphazene.

In some embodiments, based on the weight of the electrolytic solution, the weight percentage of the phosphazene compound is about 0.05 wt % to about 15 wt %. In some embodiments, based on the weight of the electrolytic solution, the weight percentage of the phosphazene compound is about 1 wt % to about 4 wt %. In some embodiments, based on the weight of the electrolytic solution, the weight percentage of the phosphazene compound is about 1 wt % to about 3 wt %. In some embodiments, when the weight percentage of the above phosphazene compound is within these ranges, the safety performance of the battery can be further improved.

II. Electrolyte

The electrolyte used in the electrolytic solution of the embodiments of the present application may be an electrolyte known in the prior art. The electrolyte includes, but is not limited to, inorganic lithium salts, such as $LiClO_4$, $LiAsF_6$, $LiPF_6$, $LiBF_4$, $LiSbF_6$, $LiSO_3F$ and $LiN(FSO_2)_2$; fluorine-containing organic lithium salts, such as $LiCF_3SO_3$, $LiN(FSO_2)(CF_3SO_2)$, $LiN(CF_3SO_2)_2$, $LiN(C_2F_5SO_2)_2$, cyclic lithium 1,3-hexafluoropropane disulfonimide, cyclic lithium 1,2-tetrafluoroethanedisulfonimide, $LiN(CF_3SO_2)(C_4F_9SO_2)$, $LiC(CF_3SO_2)_3$, $LiPF_4(CF_3)_2$, $LiPF_4(C_2F_5)_2$, $LiPF_4(CF_3SO_2)_2$, $LiPF_4(C_2F_5SO_2)_2$, $LiBF_2(CF_3)_2$, $LiBF_2(C_2F_5)_2$, $LiBF_2(CF_3SO_2)_2$, $LiBF_2(C_2F_5SO_2)_2$ and lithium 2-trifluoromethyl-4,5-dicyanoimidazole (LiTDI); and dicarboxylic acid complex-containing lithium salts, such as lithium bis(oxalate)borate, lithium difluoro(oxalate)borate, lithium tris(oxalate)phosphate, lithium difluorobis(oxalate) phosphate and lithium tetrafluoro(oxalate)phosphate. Further, the foregoing electrolytes may be used singly or in combination of two or more. For example, in some embodiments, the electrolyte comprises a combination of $LiPF_6$ and $LiBF_4$. In some embodiments, the electrolyte includes a combination of an inorganic lithium salt such as $LiPF_6$ and $LiBF_4$ and a fluorine-containing organic lithium salt such as $LiCF_3SO_3$, $LiN(CF_3SO_2)_2$ and $LiN(C_2F_5SO_2)_2$. In some embodiments, the concentration of the electrolyte is in the range of about 0.5 mol/L-about 3 mol/L, such as in the range of about 0.8 mol/L to about 2.5 mol/L, in the range of about 0.8 mol/L to about 2 mol/L or in the range of about 1 mol/L to about 2 mol/L, about 0.5 mol/L to about 1.5 mol/L, about 0.8 mol/L to about 1.3 mol/L or about 0.5 mol/L to about 1.2 mol/L, and further for example, about 1 mol/L, about 1.15 mol/L, about 1.2 mol/L, about 1.5 mol/L, about 2 mol/L or about 2.5 mol/L.

III. Electrochemical Device

The electrochemical device of the present application may be a lithium metal battery, including any of the above electrolytic solutions of the present application.

1. Electrolytic Solution

The electrolytic solution used in the electrochemical device of the present application is any of the above electrolytic solutions of the present application. Further, the electrolytic solution used in the electrochemical device of the present application may include other electrolytic solutions without departing from the gist of the present application.

2. Anode

For a material capable of being applied to an anode in the embodiment of the present invention, a constitution and a manufacturing method thereof include any technologies disclosed in the prior art.

In some embodiments, the anode active material includes a lithium metal material. In some embodiments, the anode active material is selected from lithium metal related anode materials, such as lithium metal, structured lithium metal and protecting layer modified lithium metal. In some embodiments, the structured lithium metal anode material may be formed by making a slurry from a thickener, a conductive material, a filling material or the like, coating the slurry on a current collector, drying and pressing lithium metal into the film at a certain pressure.

In some embodiments, the anode includes a lithium metal layer and a mesh insulation layer, and the mesh insulation layer is arranged on at least one surface of the lithium metal. The mesh insulation layer includes pores having a pore diameter of 10 nm to 500 μm and a porosity of 10% to 50%, and the thickness of the insulation layer is 50 nm to 500 μm. The insulation layer material may be selected from at least one of styrene-butadiene rubber (SBR), carboxymethyl cellulose (CMC), nylon, polyacrylic acid (PAA), polyvinyl alcohol (PVA), polyacetic acid (PLA), polyethylene-vinyl acetate copolymer, PEVA/PLA, polymethyl methacrylate (PMMA)/tetrahydroperfluorooctyl acrylate (TAN), polyethylene oxide (PEO), polymethyl methacrylate (PMMA), polyamide (PA), polycaprolactone (PCL), polyethylimide (PEI), polycaprolactam, polyethylene (PE), polyethylene terephthalate (PET), polyolefin, polyphenylene ether (PPE), polyvinyl chloride (PVC), polyvinylidene chloride (PVDC), polyvinylidene fluoride (PVDF), poly(vinylidene fluoride-co-hexafluoropropylene) (PVDF-HFP), polyvinylpyridine, polylactic acid (PLA), polypropylene (PP), polybutene (PB), polybutylene terephthalate (PBT), polyamide (PA), polyimide (PI), polycarbonate (PC), polytetrafluoroethylene (PTFE), polystyrene (PS), polyester (PE), acrylonitrile-butadiene-styrene (ABS), poly(methyl methacrylate) (PMMA), polyoxymethylene (POM), polysulfone (PES), styrene-acrylonitrile (SAN), polyacrylonitrile (PAN), ethylene-vinyl acetate (EVA), styrene-maleic anhydride (SMA) and vinyl resin (vinyl). The thickness of the lithium metal layer is 1 μm to 500 μm.

In some embodiments, the anode includes a lithium metal layer and a passivation layer, the passivation layer is arranged on at least a portion of the surface of the lithium metal, the passivation layer includes a particle passivation layer and a film passivation layer, and the thickness of the passivation layer is 100 nm to 600 nm. When the passivation layer is in the form of particles, the particle diameter is 10 nm to 500 nm. In some embodiments, the anode includes a lithium metal layer and a carbonaceous material layer arranged on the metal layer. In some embodiments, a polymer layer may be further included between the lithium metal layer and the carbonaceous material layer. The carbonaceous material layer is selected from at least one of artificial graphite, natural graphite, graphene, carbon nanotubes and carbon fibers.

3. Cathode

For a material capable of being applied to a cathode in the embodiment of the present invention, a constitution and a manufacturing method thereof include any technologies disclosed in the prior art. In some embodiments, the cathode is a cathode disclosed in the U.S. Pat. No. 9,812,739B, which is incorporated into the present invention by full text reference.

In some embodiments, the cathode includes a current collector and a cathode active material layer on the current collector. The cathode active material includes at least one lithiated intercalation compound that reversibly intercalates and deintercalates the lithium metal. In some embodiments, the cathode active material includes a composite oxide. In some embodiments, the composite oxide contains lithium and at least one element selected from cobalt, manganese and nickel.

In some embodiments, the cathode active material includes, but is not limited to:

$Li_aA_{1-b}X_bD_2 (0.90 \leq a \leq 1.8, 0 \leq b \leq 0.5)$,
$Li_aE_{1-b}X_bO_{2-c}D_c (0.90 \leq a \leq 1.8, 0 \leq b \leq 0.5, 0 \leq c \leq 0.05)$,
$Li_aE_{2-b}X_bD_4 (0.90 \leq a \leq 1.8, 0 \leq b \leq 0.5)$,
$Li_aE_{2-b}X_bO_{4-c}D_c (0.90 \leq a \leq 1.8, 0 \leq b \leq 0.5, 0 \leq c \leq 0.05)$,
$Li_aNi_{1-b-c}Co_bX_cD_\alpha (0.90 \leq a \leq 1.8, 0 \leq b \leq 0.5, 0 \leq c \leq 0.05, 0 < \alpha \leq 2)$,
$Li_aNi_{1-b-c}Co_bX_cO_{2-\alpha}T_\alpha (0.90 \leq a \leq 1.8, 0 \leq b \leq 0.5, 0 \leq c \leq 0.05, 0 < \alpha < 2)$,
$Li_aNi_{1-b-c}Co_bX_cO_{2-\alpha}T_2 (0.90 \leq a \leq 1.8, 0 \leq b \leq 0.5, 0 \leq c \leq 0.05, 0 < \alpha < 2)$,
$Li_aNi_{1-b-c}Mn_bX_cD_\alpha (0.90 \leq a \leq 1.8, 0 \leq b \leq 0.5, 0 \leq c \leq 0.05, 0 < \alpha \leq 2)$,
$Li_aNi_{1-b-c}Mn_bX_cO_{2-\alpha}T_\alpha (0.90 \leq a \leq 1.8, 0 \leq b \leq 0.5, 0 \leq c \leq 0.05, 0 < \alpha < 2)$,
$Li_aNi_{1-b-c}Mn_bX_cO_{2-\alpha}T_2 (0.90 \leq a \leq 1.8, 0 \leq b \leq 0.5, 0 \leq c \leq 0.05, 0 < \alpha < 2)$,
$Li_aNi_bE_cG_dO_2 (0.90 \leq a \leq 1.8, 0 \leq b \leq 0.9, 0 \leq c \leq 0.5, 0.001 \leq d \leq 0.1)$,
$Li_aNi_bCo_cMn_dG_eO_2 (0.90 \leq a \leq 1.8, 0 \leq b \leq 0.9, 0 \leq c \leq 0.5, 0 \leq d \leq 0.5, 0.001 \leq e \leq 0.1)$,
$Li_aNiG_bO_2 (0.90 \leq a \leq 1.8, 0.001 \leq b \leq 0.1)$,
$Li_aCoG_bO_2 (0.90 \leq a \leq 1.8, 0.001 \leq b \leq 0.1)$,
$Li_aMnG_bO_2 (0.90 \leq a \leq 1.8, 0.001 \leq b \leq 0.1)$,
$Li_aMn_2G_bO_4 (0.90 \leq a \leq 1.8, 0.001 \leq b \leq 0.1)$,
$QO_2, QS_2, LiQS_2, V_2O_5, LiV_2O_5, LiIO_2, LiNiVO_4, Li_{(3-f)}J_2(PO_4)_3 (0 \leq f \leq 2), Li_{(3-f)}Fe_2(PO_4)_3 (0 \leq f \leq 2)$ or $LiFePO_4$, wherein, A is selected from Ni, Co, Mn and any combination thereof; X is selected from Al, Ni, Co, Mn, Cr, Fe, Mg, Sr, V, rare-earth elements and any combination thereof; D is selected from O, F, S, P and any combination thereof; E is selected from Co, Mn and any combination thereof; T is selected from F, S, P and any combination thereof; G is selected from Al, Cr, Mn, Fe, Mg, La, Ce, Sr, V and any combination thereof; Q is selected from Ti, Mo, Mn and any combination thereof; I is selected from Cr, V, Fe, Sc, Y and any combination thereof; and J is selected from V, Cr, Mn, Co, Ni, Cu and any combination thereof.

In some embodiments, the cathode active material is selected from lithium cobalt oxide ($LiCoO_2$), lithium nickel cobalt manganese (NCM), lithium iron phosphate ($LiFePO_4$), lithium manganate ($LiMn_2O_4$), lithium nickel manganese oxide ($LiNi_{0.5}Mn_{1.5}O_4$) or any combination thereof.

In some embodiments, the cathode active material may have a coating on its surface or may be mixed with another compound having a coating. The coating may include at least one coating element compound selected from an oxide of the coating element, a hydroxide of the coating element, an oxyhydroxide of the coating element, a bicarbonate of the coating element and a hydroxycarbonate of the coating element. The compound used for the coating may be amorphous or crystalline.

In some embodiments, the coating element contained in the coating may include Mg, Al, Co, K, Na, Ca, Si, Ti, V, Sn, Ge, Ga, B, As, Zr or any combination thereof. The coating may be applied by any method as long as the method does not adversely affect the performance of the cathode active material. For example, the method may include any coating methods known in the art, such as spraying and impregnation.

The cathode active material layer may further include a binder, and optionally includes a conductive material. The binder improves the binding of the cathode active material particles to each other, and also improves the binding of the cathode active material to the current collector.

In some embodiments, the binder includes, but is not limited to, polyvinyl alcohol, hydroxypropyl cellulose, diacetyl cellulose, polyvinyl chloride, carboxylated polyvinyl chloride, polyvinyl fluoride, ethylene oxide containing polymers, polyvinylpyrrolidone, polyurethane, polytetrafluoroethylene, poly(1,1-difluoroethylene), polyethylene, polypropylene, styrene butadiene rubber, acrylated styrene butadiene rubber, epoxy resin and nylon.

In some embodiments, the conductive material includes, but is not limited to, a carbon-based material, a metal-based material, a conductive polymer and a mixture thereof. In some embodiments, the carbon-based material is selected from natural graphite, artificial graphite, carbon black, acetylene black, Ketjen black, carbon fibers, carbon nanotubes or any combination thereof. In some embodiments, the metal-based material is selected from metal powder, metal fibers, copper, nickel, aluminum and silver. In some embodiments, the conductive polymer is a polyphenylene derivative.

In some embodiments, the thickness of the cathode is about 50 μm to 200 μm. In some embodiments, the thickness of the cathode is about 60 μm to 190 μm.

In some embodiments, the current collector may be, but not limited to, aluminum.

The cathode may be prepared by a preparation method known in the art. For example, the cathode may be obtained by the following method: mixing an active material, a conductive material and a binder in a solvent to prepare an active material composition, and coating the active material composition on a current collector. In some embodiments, the solvent may include N-methylpyrrolidone, acetone and water, but is not limited to them.

4. Separator

In some embodiments, a separator is provided between the cathode and the anode of the electrochemical device of the present application to prevent a short circuit. The material and shape of the separator used in the electrochemical device of the present application are not particularly limited, and may be any of the techniques disclosed in the prior art. In some embodiments, the separator includes a polymer or an inorganic substance formed by a material stable in the electrolytic solution of the present invention.

For example, the separator may include a substrate layer and a surface treatment layer. The substrate layer is a nonwoven fabric, a film or a composite film having a porous structure, and the material of the substrate layer is at least one selected from polyethylene, polypropylene, polyethylene terephthalate and polyimide. Specifically, a polypropylene porous film, a polyethylene porous film, polypropylene nonwoven cloth, polyethylene nonwoven cloth or a polypropylene-polyethylene-polypropylene porous composite film can be adopted.

At least one surface of the substrate layer is provided with the surface treatment layer, and the surface treatment layer may be a polymer layer or an inorganic substance layer, or may be a layer formed by mixing a polymer and an inorganic substance.

The inorganic substance layer includes inorganic particles and a binder, and the inorganic particles are selected from one or a combination of several of aluminum oxide, silicon oxide, magnesium oxide, titanium oxide, hafnium oxide, tin oxide, cerium oxide, nickel oxide, zinc oxide, calcium oxide, zirconium oxide, yttrium oxide, silicon carbide, boehmite, aluminum hydroxide, magnesium hydroxide, calcium hydroxide and barium sulfate. The binder is selected from one or a combination of several of polyvinylidene fluoride, vinylidene fluoride-hexafluoropropylene copolymer, polyamide, polyacrylonitrile, polyacrylate, polyacrylic acid, polyacrylate, polyvinylpyrrolidone, polyvinyl ether, polymethyl methacrylate, polytetrafluoroethylene and polyhexafluoropropylene. The polymer layer includes a polymer, and the material of the polymer is at least one selected from polyamide, polyacrylonitrile, acrylate polymer, polyacrylic acid, polyacrylate, polyvinylpyrrolidone, polyvinyl ether, polyvinylidene fluoride or poly(vinylidene fluoride-hexafluoropropylene).

IV. Application

The electrolytic solution according to the embodiments of the present application can be used for enhancing the rate performance, the room-temperature storage capacity retention rate and the cycle performance and high-temperature storage performance of the battery, and is suitable for use in an electronic device including an electrochemical device.

The use of the electrochemical device of the present application is not particularly limited, and the electrochemical device can be used in various known uses. For example, a notebook computer, a pen input computer, a mobile computer, an e-book player, a portable phone, a portable fax machine, a portable copy machine, a portable printer, stereo headphones, a video recorder, a liquid crystal display television, a portable cleaner, a portable CD player, a mini disc player, a transceiver, an electronic notebook, a calculator, a memory card, a portable recorder, a radio, a backup power, a motor, a car, a motorcycle, a power bicycle, a bicycle, a lighting fixture, a toy, a game console, a clock, an electric tool, a flash lamp, a camera, a large household battery or a lithium-ion capacitor.

Hereinafter, the lithium metal battery is taken as an example and the preparation of the lithium metal battery is described in conjunction with a specific embodiment. Those skilled in the art would understand that the preparation method described in the present application is merely an example, and any other suitable preparation methods fall within the scope of the present application.

Embodiments

The following describes embodiments and comparative examples of the lithium metal battery according to the present application for performance evaluation.

1. Preparation of a Lithium Metal Battery (1) Preparation of a Cathode

A cathode active material lithium cobalt oxide (LiCoO$_2$), a conductive agent (Super P® conductive carbon) and a binder polyvinylidene fluoride were mixed according to a weight ratio of about 97:1.4:1.6, N-methylpyrrolidone (NMP) was added, and the mixture was stirred in a vacuum mixer until the system was uniform so as to obtain a cathode slurry, wherein the solid content of the cathode slurry was about 72 wt %; the cathode slurry was uniformly coated on an aluminum foil, the thickness being controlled to be about 60 μm; and the aluminum foil was dried at about 85° C., then subjected to cold pressing, cutting and slitting, and then dried under vacuum at about 85° C. for about 4 h.

(2) Preparation of an Anode

Metal lithium was composited onto an anode current collector copper foil having a thickness of about 12 μm by physical rolling, and a lithium-copper composite tape was coated with lithium on one side by adjusting the pressure of the roller, the thickness being controlled to be about 50 μm. Then, after cutting and slitting, the lithium-copper composite tape was placed in a dry argon atmosphere glove box and stored for use.

(3) Preparation of a Separator

Polyethylene (PE) having a thickness of about 15 μm was used as the separator.

(4) Preparation of an Electrolytic Solution

Embodiments 1-10 and Comparative Examples 1-6: firstly, in a dry argon atmosphere, the cyclic fluorocarbonate of Formula A, the chain fluorocarbonate of Formula B or C, and the fluoroether compound of Formula D or E were uniformly mixed, and LiPF$_6$ was added to the mixed solution and dissolved uniformly to obtain the electrolytic solution with a lithium salt concentration of about 1 mol/L.

The preparation method of the electrolytic solution of Comparative Examples 7-9 was similar to that of Embodiments 1-10, except that the chain fluorocarbonate was not added to the electrolytic solution of Comparative Example 7, the chain fluorocarbonate was not added to the electrolytic solution of Comparative Example 8, and the fluoroether compound was not added to the electrolytic solution of Comparative Example 9.

Embodiments 11-20 and Comparative Examples 10-11: firstly, in a dry argon atmosphere, the cyclic fluorocarbonate of Formula A, the chain fluorocarbonate of Formula B, and the fluoroether compound of Formula D were uniformly mixed, and LiPF$_6$ was added to the mixed solution and dissolved uniformly (the lithium salt concentration was about 1 mol/L), an additive of Formula F, G or H was added to obtain the electrolytic solution.

The cyclic fluorocarbonate in the electrolytic solution of the embodiments is selected from Formula A:

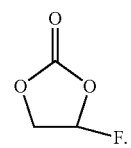

Formula A

The chain fluorocarbonate in the electrolytic solution of the embodiments is selected from Formula B or C:

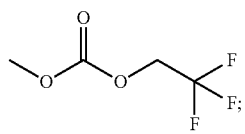

Formula B

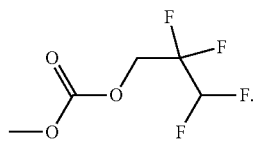

Formula C

The fluoroether compound in the electrolytic solution of the embodiments is selected from Formula D or E:

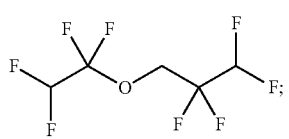

Formula D

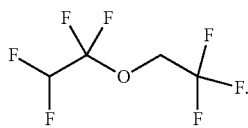

Formula E

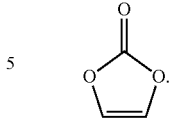

The additive in the electrolytic solution of the embodiments is selected from Formula F, G or H:

Formula F

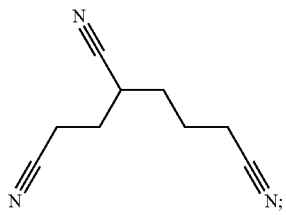

Formula G

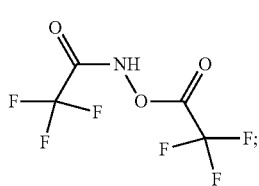

Formula H

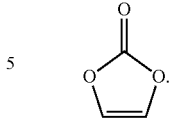

Table 1 shows the compositions of the electrolytic solutions in the embodiments and comparative examples, in which the content of each substance in the electrolytic solution was calculated based on the weight of the electrolytic solution after removing the lithium salt. The weight percentage of the cyclic fluorocarbonate is X, and the sum of the weight percentages of the chain fluorocarbonate and the fluoroether compound is Y.

(5) Preparation of a Lithium Metal Battery

By stacking a cathode, a separator and a metal lithium anode in sequence; welding tabs, placing in an outer packaging aluminum plastic film; and after vacuum encapsulation, standing, formation (charging to 3.3 V at a constant current of 0.02 C, then charging to 3.6 V at a constant current of 0.1 C), shaping, capacity testing and other processes, a single-layer soft pack laminated lithium metal battery was obtained.

TABLE 1

| No. | Cyclic fluorocarbonate of Formula A (wt %) | Chain fluorocarbonate of Formula B (wt %) | Chain fluorocarbonate of Formula C (wt %) | Fluoroether compound of Formula D (wt %) | Fluoroether compound of Formula E (wt %) | Additive of Formula F (wt %) | Additive of Formula G (wt %) | Additive of Formula H (wt %) | Y/X |
|---|---|---|---|---|---|---|---|---|---|
| Embodiment 1 | 20 | 60 | — | 20 | — | — | — | — | 4.00 |
| Embodiment 2 | 30 | 55 | — | 15 | — | — | — | — | 2.33 |
| Embodiment 3 | 35 | 50 | — | 15 | — | — | — | — | 1.86 |
| Embodiment 4 | 40 | 40 | — | 20 | — | — | — | — | 1.50 |
| Embodiment 5 | 60 | 20 | — | 20 | — | — | — | — | 0.67 |
| Embodiment 6 | 20 | — | 60 | — | 20 | — | — | — | 4.00 |
| Embodiment 7 | 30 | — | 55 | — | 15 | — | — | — | 2.33 |
| Embodiment 8 | 35 | — | 50 | — | 15 | — | — | — | 1.86 |
| Embodiment 9 | 40 | — | 40 | — | 20 | — | — | — | 1.50 |
| Embodiment 10 | 60 | — | 20 | — | 20 | — | — | — | 0.67 |
| Embodiment 11 | 19.9 | 60 | — | 20 | — | 0.1 | — | — | 4.02 |
| Embodiment 12 | 19 | 60 | — | 20 | — | 1 | — | — | 4.21 |
| Embodiment 13 | 17 | 60 | — | 20 | — | 3 | — | — | 4.71 |
| Embodiment 14 | 19.8 | 60 | — | 20 | — | — | 0.2 | — | 4.04 |
| Embodiment 15 | 19.5 | 60 | — | 20 | — | — | 0.5 | — | 4.10 |
| Embodiment 16 | 19 | 60 | — | 20 | — | — | 1 | — | 4.21 |
| Embodiment 17 | 19 | 60 | — | 20 | — | 0.5 | 0.5 | — | 4.21 |
| Embodiment 18 | 19 | 60 | — | 20 | — | 1 | 0.5 | 0.5 | 4.44 |
| Embodiment 19 | 19.5 | 60 | — | 20 | — | — | — | 0.5 | 4.1 |
| Embodiment 20 | 18.5 | 60 | — | 20 | — | 1 | 0.5 | — | 4.32 |
| Comparative Example 1 | 10 | 60 | — | 30 | — | — | — | — | 9.00 |
| Comparative Example 2 | 90 | 5 | — | 5 | — | — | — | — | 0.11 |
| Comparative Example 3 | 20 | 10 | — | 70 | — | — | — | — | 4.00 |
| Comparative Example 4 | 5 | 90 | — | 5 | — | — | — | — | 19.00 |
| Comparative Example 5 | 20 | 70 | — | 10 | — | — | — | — | 4.00 |
| Comparative Example 6 | 5 | 5 | — | 90 | — | — | — | — | 19.00 |
| Comparative Example 7 | 0 | 60 | — | 40 | — | — | — | — | — |
| Comparative Example 8 | 20 | 0 | — | 80 | — | — | — | — | 4.00 |
| Comparative Example 9 | 20 | 80 | — | 0 | — | — | — | — | 4.00 |

TABLE 1-continued

| No. | Cyclic fluorocarbonate of Formula A (wt %) | Chain fluorocarbonate of Formula B (wt %) | Chain fluorocarbonate of Formula C (wt %) | Fluoroether compound of Formula D (wt %) | Fluoroether compound of Formula E (wt %) | Additive of Formula F (wt %) | Additive of Formula G (wt %) | Additive of Formula H (wt %) | Y/X |
|---|---|---|---|---|---|---|---|---|---|
| Comparative Example 10 | 19 | 55 | — | 20 | — | 6 | — | — | 3.95 |
| Comparative Example 11 | 19 | 55 | — | 20 | — | — | 6 | — | 3.95 |

"—" means that the substance was not added.

2. Lithium Metal Battery Performance Testing Process (1) Lithium Metal Battery Cycle Performance Test The lithium metal battery was placed in a 45° C. incubator and allowed to stand for 30 minutes to allow the lithium metal battery to maintain a constant temperature. The constant-temperature lithium metal battery was charged to a voltage of 4.4 V at a constant current of 0.1 C, then charged to a current of 0.05 C at a constant voltage of 4.4 V, and discharged to a voltage of 3 V at a constant current of 0.5 C, which was a charge and discharge cycle. The first discharge capacity was recorded as 100%, the charge and discharge cycle was repeated, and when the discharge capacity was attenuated to 80%, the test was stopped, and the number of cycles was recorded as an index for evaluating the cycle performance of the lithium metal battery. "1 C" is the current value at which the battery capacity was completely discharged within 1 hour.

(2) Lithium Metal Battery Dynamics Performance Test

At room temperature, the lithium metal battery was charged to 4.4 V at 0.1 C, then charged to a current of 0.05 C at a constant voltage of 4.4 V, allowed to stand for 5 minutes, and discharged to a voltage of 3 V at a constant current of 0.2 C. The discharge capacity was recorded, and a discharge capacity at 0.2 C was used as a reference. The discharge capacity at 1 C was tested: the lithium metal battery was charged to 4.4 V at 0.1 C, then charged to a current of 0.05 C at a constant voltage of 4.4 V, allowed to stand for 5 minutes, and discharged to a voltage of 3 V at a constant current of 1 C, and the discharge capacity was recorded. The capacity retention rate was calculated according to the following formula:

Capacity retention rate=1 C discharge capacity/0.2 C discharge capacity×100%

Table 2 shows the test results of the lithium metal batteries of Embodiments 1-20 and Comparative Examples 1-11.

TABLE 2

| No. | Cycle Performance Number of Cycles at 45° C. | Dynamics Performance Capacity Retention Rate |
|---|---|---|
| Embodiment 1 | 254 | 91% |
| Embodiment 2 | 249 | 93% |
| Embodiment 3 | 246 | 90% |
| Embodiment 4 | 240 | 85% |
| Embodiment 5 | 235 | 81% |
| Embodiment 6 | 258 | 94% |
| Embodiment 7 | 251 | 94% |
| Embodiment 8 | 247 | 92% |
| Embodiment 9 | 243 | 86% |
| Embodiment 10 | 238 | 82% |
| Embodiment 11 | 263 | 95% |
| Embodiment 12 | 269 | 95% |
| Embodiment 13 | 272 | 94% |
| Embodiment 14 | 265 | 95% |
| Embodiment 15 | 273 | 95% |
| Embodiment 16 | 282 | 95% |
| Embodiment 17 | 289 | 95% |
| Embodiment 18 | 305 | 94% |
| Embodiment 19 | 272 | 95% |
| Embodiment 20 | 293 | 95% |
| Comparative Example 1 | 50 | 80% |
| Comparative Example 2 | 157 | 40% |
| Comparative Example 3 | 34 | 84% |
| Comparative Example 4 | 0 | 0% |
| Comparative Example 5 | 154 | 78% |
| Comparative Example 6 | 0 | 0% |
| Comparative Example 7 | 0 | 0% |
| Comparative Example 8 | 0 | 0% |
| Comparative Example 9 | 121 | 65% |
| Comparative Example 10 | 75 | 55% |
| Comparative Example 11 | 86 | 60% |

"0" means that the battery cannot be cycled and cannot be used.

As can be seen from the test results of Embodiments 1-5 and Embodiments 6-10, when the weight percentage (X) of the cyclic fluorocarbonate and the sum (Y) of the weight percentages of the chain fluorocarbonate and the fluoroether compound meet the following requirement: about 0.25≤Y/X≤about 5.7, the electrolytic solution can dissolve the lithium salt well, and an appropriate amount of the SEI film having the LiF component was formed on the anode, which can inhibit the growth of lithium dendrites and significantly reduce the viscosity of the electrolytic solution at the same time, thereby enhancing the safety performance, cycle performance and rate performance of the lithium metal battery.

As can be seen from the test results of Embodiments 1-10 and Comparative Example 1, when the content of the cyclic fluorocarbonate in the electrolytic solution was too low, the cycle life and rate performance of the battery were affected. This may be because the dissolving capacity of the electrolytic solution to the lithium salt was reduced such that the components forming the film on the anode are changed, resulting in a decrease in the LiF-containing SEI film. Moreover, the consumption of cyclic fluorocarbonate during cycling will further increase the influence on the composition, impedance and thickness of the SEI film, which may cause the lithium in the anode to be quickly consumed, thereby reducing the cycle life.

As can be seen from the test results of Embodiments 1-10 and Comparative Example 2, when the content of the cyclic fluorocarbonate in the electrolytic solution was too high, the rate performance and cycle performance of the battery were affected. This may be because a too high content of the cyclic fluorocarbonate affected the conductivity of the lithium ions in the battery. Moreover, a too high content of the cyclic fluorocarbonate is unstable in the cathode, thereby affecting the rate performance and cycle performance of the battery.

As can be seen from the test results of Embodiments 1-10 and Comparative Examples 4 and 6, when the content of the chain fluorocarbonate or the fluoroether compound in the electrolytic solution was too high, the content of the cyclic fluorocarbonate in the electrolytic solution was low, and the contents of these three substances do not meet the following requirement: about 0.67≤Y/X≤about 5.7, thus the electrolytic solution was unusable.

As can be seen from the test results of Embodiments 1-10 and Comparative Examples 7-9, when the cyclic fluorocarbonate, the chain fluorocarbonate or the fluoroether compound was absent in the electrolytic solution, the battery was unusable. This may be because the suitable content range of the fluoroether compound, the cyclic fluorocarbonate and the chain fluorocarbonate made the LiF content in the SEI film formed on the surface of the anode be within a suitable range, and the SEI film is beneficial to the conduction of lithium ions while protecting the anode and can ensure the stability of the cathode such that the lithium metal battery achieved stable long-term cycling.

As can be seen from the test results of Embodiments 1-10 and Embodiments 11-13, after adding an appropriate amount of the additive of Formula F to the electrolytic solution, the cycle performance of the battery can be further enhanced. This may because the combined action of the fluoroether compound, the cyclic fluorocarbonate, the chain fluorocarbonate and the additive of Formula F can stabilize the interface between the cathode and the electrolytic solution, reduce side reactions between the electrolytic solution and the surface of the cathode and reduce the impedance increase of the battery during cycling, thereby improving the cycle performance of the battery.

As can be seen from the test results of Embodiments 1-10 and Embodiments 14-16, the addition of the anode additive of Formula G to the electrolytic solution can significantly improve the cycle performance of the battery. This may be because the combined action of the fluoroether compound, the cyclic fluorocarbonate, the chain fluorocarbonate and the additive of Formula G can diversify the components of the SEI film on the surface of the anode, and promote further dissolution of the lithium salt at the same time, such that the lithium ion concentration on the surface of the anode was more uniform and the formation of lithium dendrites was reduced, thereby contributing to the improvement of the cycle coulombic efficiency of the battery. As can be seen from the test results of Embodiments 1-10 and Embodiment 19, after adding an appropriate amount of the anode additive containing an unsaturated bond to the electrolytic solution, a compact organic polymer SEI layer was formed on the anode of the battery, which can effectively inhibit the growth of lithium dendrites and make lithium deposition more uniform and denser, thereby improving the cycle life of the battery.

As can be seen from the test results of Embodiments 1-10 and Embodiments 17, 18 and 20, the addition of the additive of Formula F and the additive of Formula G, or the additive of Formula F, the additive of Formula G and the additive of Formula H to the electrolytic solution containing the fluoroether compound, the cyclic fluorocarbonate and the chain fluorocarbonate can further enhance the cycle performance of the lithium metal battery. This may be because the addition of the fluoroether compound, the cyclic fluorocarbonate, the chain fluorocarbonate, the additive of Formula F, the additive of Formula G and the additive of Formula H in the entire battery system can make the lithium deposition on the anode more uniform, reduce the formation of lithium dendrites and reduce side reactions at the interface between the cathode and the electrolytic solution.

References to "embodiments," "part of embodiments," "one embodiment," "another example," "example," "specific example" or "part of examples" in the whole specification mean that at least one embodiment or example in the application comprises specific features, structures, materials or characteristics described in the embodiments or examples. Thus, the descriptions appear throughout the specification, such as "in some embodiments," "in an embodiment," "in one embodiment," "in another example," "in one example," "in a specific example" or "an example," which do not necessarily refer to the same embodiment or example in the present application. Furthermore, the specific features, structures, materials or characteristics in the descriptions can be combined in any suitable manner in one or more embodiments or examples.

Although the illustrative embodiments have been shown and described, it should be understood by those skilled in the art that the above embodiments cannot be interpreted as limiting the present application, and the embodiments can be changed, substituted and modified without departing from the spirit, principle and scope of the present application.

What is claimed is:

1. An electrolytic solution comprising a cyclic fluorocarbonate, a chain fluorocarbonate and a fluoroether compound, wherein based on the weight of the electrolytic solution, the weight percentage of the cyclic fluorocarbonate is X, and the sum of the weight percentages of the chain fluorocarbonate and the fluoroether compound is Y, wherein X is 15 wt % to 80 wt %, and 0.67≤Y/X≤5.7.

2. The electrolytic solution according to claim 1, wherein based on the weight of the electrolytic solution, the weight percentage of the chain fluorocarbonate is 5 wt % to 70 wt %, and the weight percentage of the fluoroether compound is 5 wt % to 70 wt %.

3. The electrolytic solution according to claim 1, wherein the cyclic fluorocarbonate comprises the compound of Formula I, and the chain fluorocarbonate comprises the compound of Formula II:

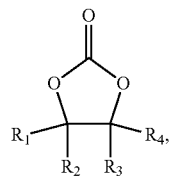

Formula I

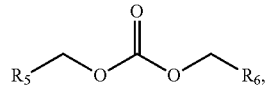

Formula II wherein $R_1$, $R_2$, $R_3$ and $R_4$ are each independently selected from hydrogen, a fluorine atom, an alkyl group having 1-12 carbon atoms, a fluoroalkyl group having 1-12 carbon atoms, a cycloalkyl group having 3-12 carbon atoms, a fluorocycloalkyl group having 3-12 carbon atoms, an alkenyl group having 2-12 carbon atoms, a fluoroalkenyl group having 2-12 carbon atoms, a heterocyclic group having 3-12 carbon atoms or a fluoroheterocyclic group having 3-12 carbon atoms, and wherein at least one of $R_1$, $R_2$, $R_3$ and $R_4$ is a fluorine atom, a fluoroalkyl group having 1-12 carbon atoms, a fluorocycloalkyl group having 3-12 carbon atoms, a fluoroalkenyl group having 2-12 carbon atoms or a fluoroheterocyclic group having 3-12 carbon atoms;

wherein $R_5$ and $R_6$ are each independently selected from hydrogen, a fluorine atom, an alkyl group having 1-12 carbon atoms, a fluoroalkyl group having 1-12 carbon atoms, an alkoxy group having 1-12 carbon atoms, a fluoroalkoxy group having 1-12 carbon atoms, an alkenyl group having 2-12 carbon atoms, a fluoroalkenyl group having 2-12 carbon atoms, an aryl group having 6-26 carbon atoms or a fluoroaryl group having 6-26 carbon atoms, and at least one of $R_5$ and $R_6$ is a fluoroalkyl group having 1-12 carbon atoms, a fluoroalkoxy group having 1-12 carbon atoms, a fluoroalkenyl group having 2-12 carbon atoms or a fluoroaryl group having 6-26 carbon atoms.

4. The electrolytic solution according to claim 1, wherein the cyclic fluorocarbonate comprises at least one of the following compounds: fluoroethylene carbonate, 4,5-difluoroethylene carbonate or 4,4,5,5-tetrafluoroethylene carbonate; and the chain fluorocarbonate comprises at least one of the following compounds: methyl trifluoroethyl carbonate, methyl 2,2,3,3-tetrafluoropropyl carbonate or bis(2,2,2-trifluoroethyl) carbonate.

5. The electrolytic solution according to claim 1, wherein the fluoroether compound comprises at least one of the compounds of Formula III, Formula IV, Formula V or Formula VI:

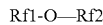  Formula III,

  Formula IV,

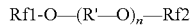  Formula V,

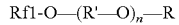  Formula VI, wherein in Formulas III, IV, V and VI, Rf1 and Rf2 are each independently selected from a linear or branched fluoroalkyl group having 1-12 carbon atoms in which at least one hydrogen atom is replaced by a fluorine atom, R is a linear or branched alkyl group having 1-12 carbon atoms, R' is a linear or branched alkylene group having 1-5 carbon atoms, and n is an integer from 1 to 5.

6. The electrolytic solution according to claim 1, wherein the fluoroether compound comprises at least one of the following compounds: $CF_3CH_2OCH_2CF_3$, $HCF_2CF_2OCH_2CF_3$, $HCF_2CF_2OCH_2CF_2CF_2H$, $(CF_3)_2CFCF(CF_2CF_3)(OCH_3)$, $CF_3CHFCF_2CH(CH_3)OCF_2CHFCF_3$, $HCF_2CF_2CH_2OCF_2CF_2CF_2CF_2H$, $HCF_2CF_2OCH_2CF_3$, $HCF_2CF_2OCH_2CH_2OCF_2CF_2H$, $HCF_2CF_2OCH_2CH_2CH_2OCF_2CF_2H$, $HCF_2CF_2CH_2OCF_2CF_2CF_2H$, $HCF_2CF_2OCH_2CH_2OCF_2CF_2CF_2H$, $HCF_2CF_2OCH_2CH_2CH_2OCF_2CF_2CF_2H$, $CH_3OCH_2CH_2OCH_2CH_2F$, $CH_3OCH_2CH_2OCH_2CF_3$, $CH_3OCH_2CH(CH_3)OCH_2CH_2F$, $CH_3OCH_2CH(CH_3)OCH_2CF_3$, $FCH_2CH_2OCH_2CH_2OCH_2CH_2F$, $FCH_2CH_2OCH_2CH(CH_3)OCH_2CH_2F$, $CF_3CH_2O(CH_2CH_2O)_2CH_2CF_3$ or $CF_3CH_2OCH_2CH(CH_3)OCH_2CF_3$.

7. The electrolytic solution according to claim 1, wherein the electrolytic solution further comprises an additive, the additive comprising at least one of the following compounds: vinylethylene carbonate, lithium bis(oxalate)borate, lithium borate difluoroxalate, lithium tetrafluoroborate, methylene methanedisulfonate, ethylene 4-trifluoromethyl carbonate, 1,3,2-dioxathiolane-2,2-dioxide, fluoroethylene carbonate, ethylene sulfite, vinylene carbonate, butanedioic anhydride, propylene sulfite, propenyl 1,3-sultone, bis(trimethylsilyl) sulfate, lithium nitrate, N-butyl,methylpyrrolidinium bis((trifluoromethyl)sulfonyl)imide, n-propyl, methylpiperidinium bis((trifluoromethyl)sulfonyl)imide, 1,3-dioxane, 1,4-dioxane, 1,2-bis(cyanoethoxy)ethane, adiponitrile, fumaronitrile, succinonitrile, 1,3,5-pentanetricarbonitrile, 1,3,6-hexanetricarbonitrile, 1,2,3-tris(2-cyanoethoxy)propane or a fluoroacylhydroxylamine compound, wherein the fluoroacylhydroxylamine compound comprises the compound of Formula VII:

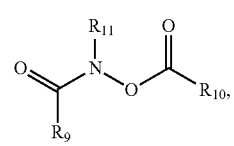  Formula VII wherein $R_9$ and $R_{10}$ are each independently selected from a hydrocarbyl group having 1-12 carbon atoms or a fluorohydrocarbyl group having 1-12 carbon atoms, $R_{11}$ is selected from a hydrogen atom or a hydrocarbyl group having 1-6 carbon atoms, and at least one of $R_9$ and $R_{10}$ is a fluorohydrocarbyl group having 1-12 carbon atoms.

8. The electrolytic solution according to claim 7, wherein the fluoroacylhydroxylamine compound comprises N,O-bis(trifluoroacetyl)hydroxylamine, N-methoxy-N-methyl-2,2,2-trifluoroacetamide or a combination thereof.

9. The electrolytic solution according to claim 7, wherein based on the weight of the electrolytic solution, the weight percentage of the additive is 0.05 wt % to 15 wt %.

10. An electrochemical device, comprising an electrolytic solution, wherein the electrolytic solution comprises a cyclic fluorocarbonate, a chain fluorocarbonate and a fluoroether compound, wherein based on the weight of the electrolytic solution, the weight percentage of the cyclic fluorocarbonate is X, and the sum of the weight percentages of the chain fluorocarbonate and the fluoroether compound is Y, wherein X is 15 wt % to 80 wt %, and $0.67 \leq Y/X \leq 5.7$.

11. The electrochemical device according to claim 10, wherein based on the weight of the electrolytic solution, the weight percentage of the chain fluorocarbonate is 5 wt % to 70 wt %, and the weight percentage of the fluoroether compound is 5 wt % to 70 wt %.

12. The electrochemical device according to claim 10, wherein the cyclic fluorocarbonate comprises the compound of Formula I, and the chain fluorocarbonate comprises the compound of Formula II:

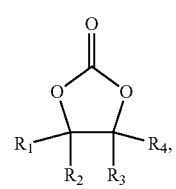  Formula I

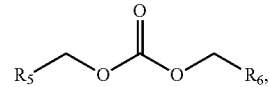  Formula II wherein $R_1$, $R_2$, $R_3$ and $R_4$ are each independently selected from hydrogen, a fluorine atom, an alkyl group having 1-12 carbon atoms, a fluoroalkyl group having 1-12 carbon atoms, a cycloalkyl group having 3-12 carbon atoms, a fluorocycloalkyl group having 3-12 carbon atoms, an alkenyl group having 2-12 carbon atoms, a fluoroalkenyl group having 2-12 carbon atoms, a heterocyclic group having 3-12 carbon atoms or a fluoroheterocyclic group having 3-12 carbon atoms, and wherein at least one of $R_1$, $R_2$, $R_3$ and $R_4$ is a fluorine atom, a fluoroalkyl group having 1-12 carbon atoms, a fluorocycloalkyl group having 3-12 carbon atoms, a fluoroalkenyl group having 2-12 carbon atoms or a fluoroheterocyclic group having 3-12 carbon atoms;

wherein $R_5$ and $R_6$ are each independently selected from hydrogen, a fluorine atom, an alkyl group having 1-12 carbon atoms, a fluoroalkyl group having 1-12 carbon atoms, an alkoxy group having 1-12 carbon atoms, a fluoroalkoxy group having 1-12 carbon atoms, an alkenyl group having 2-12 carbon atoms, a fluoroalkenyl group having 2-12 carbon atoms, an aryl group having 6-26 carbon atoms or a fluoroaryl group having 6-26 carbon atoms, and at least one of $R_5$ and $R_6$ is a fluoroalkyl group having 1-12 carbon atoms, a fluoroalkoxy group having 1-12 carbon atoms, a fluoroalkenyl group having 2-12 carbon atoms or a fluoroaryl group having 6-26 carbon atoms.

13. The electrochemical device according to claim 10, wherein the cyclic fluorocarbonate comprises at least one of the following compounds: fluoroethylene carbonate, 4,5-difluoroethylene carbonate or 4,4,5,5-tetrafluoroethylene carbonate; and the chain fluorocarbonate comprises at least one of the following compounds: methyl trifluoroethyl carbonate, methyl 2,2,3,3-tetrafluoropropyl carbonate or bis(2,2,2-trifluoroethyl) carbonate.

14. An electronic device comprising an electrochemical device, wherein the electrochemical device comprises an electrolytic solution, wherein the electrolytic solution comprises a cyclic fluorocarbonate, a chain fluorocarbonate and a fluoroether compound, wherein based on the weight of the electrolytic solution, the weight percentage of the cyclic fluorocarbonate is X, and the sum of the weight percentages of the chain fluorocarbonate and the fluoroether compound is Y, wherein X is 15 wt % to 80 wt %, and $0.67 \leq Y/X \leq 5.7$.

15. The electronic device of claim 14, wherein based on the weight of the electrolytic solution, the weight percentage of the chain fluorocarbonate is 5 wt % to 70 wt %, and the weight percentage of the fluoroether compound is 5 wt % to 70 wt %.

16. The electronic device of claim 14, wherein the cyclic fluorocarbonate comprises the compound of Formula I, and the chain fluorocarbonate comprises the compound of Formula II:

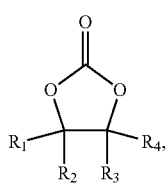

Formula I

-continued

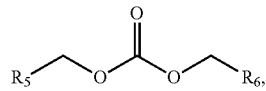

Formula II wherein $R_1$, $R_2$, $R_3$ and $R_4$ are each independently selected from hydrogen, a fluorine atom, an alkyl group having 1-12 carbon atoms, a fluoroalkyl group having 1-12 carbon atoms, a cycloalkyl group having 3-12 carbon atoms, a fluorocycloalkyl group having 3-12 carbon atoms, an alkenyl group having 2-12 carbon atoms, a fluoroalkenyl group having 2-12 carbon atoms, a heterocyclic group having 3-12 carbon atoms or a fluoroheterocyclic group having 3-12 carbon atoms, and wherein at least one of $R_1$, $R_2$, $R_3$ and $R_4$ is a fluorine atom, a fluoroalkyl group having 1-12 carbon atoms, a fluorocycloalkyl group having 3-12 carbon atoms, a fluoroalkenyl group having 2-12 carbon atoms or a fluoroheterocyclic group having 3-12 carbon atoms;

wherein $R_5$ and $R_6$ are each independently selected from hydrogen, a fluorine atom, an alkyl group having 1-12 carbon atoms, a fluoroalkyl group having 1-12 carbon atoms, an alkoxy group having 1-12 carbon atoms, a fluoroalkoxy group having 1-12 carbon atoms, an alkenyl group having 2-12 carbon atoms, a fluoroalkenyl group having 2-12 carbon atoms, an aryl group having 6-26 carbon atoms or a fluoroaryl group having 6-26 carbon atoms, and at least one of $R_5$ and $R_6$ is a fluoroalkyl group having 1-12 carbon atoms, a fluoroalkoxy group having 1-12 carbon atoms, a fluoroalkenyl group having 2-12 carbon atoms or a fluoroaryl group having 6-26 carbon atoms.

17. The electronic device of claim 14, wherein the cyclic fluorocarbonate comprises at least one of the following compounds: fluoroethylene carbonate, 4,5-difluoroethylene carbonate or 4,4,5,5-tetrafluoroethylene carbonate; and the chain fluorocarbonate comprises at least one of the following compounds: methyl trifluoroethyl carbonate, methyl 2,2,3,3-tetrafluoropropyl carbonate or bis(2,2,2-trifluoroethyl) carbonate.

18. The electrolytic solution according to claim 1, wherein the electrolytic solution further comprises an additive, the additive comprises at least one of the following compounds:

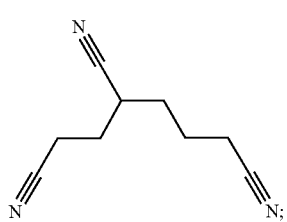

formula F

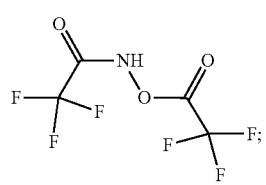

formula G formula H

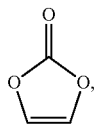

wherein based on the weight of the electrolytic solution, the weight percentage of the additive is 0.05 wt %-15 wt %.

19. The electrochemical device according to claim 10, wherein the electrolytic solution further comprises an additive, the additive comprising at least one of the following compounds: vinylethylene carbonate, lithium bis(oxalate) borate, lithium borate difluoroxalate, lithium tetrafluoroborate, methylene methanedisulfonate, ethylene 4-trifluoromethyl carbonate, 1,3,2-dioxathiolane-2,2-dioxide, fluoroethylene carbonate, ethylene sulfite, vinylene carbonate, butanedioic anhydride, propylene sulfite, propenyl 1,3-sultone, bis(trimethylsilyl) sulfate, lithium nitrate, N-butyl, methylpyrrolidinium bis((trifluoromethyl)sulfonyl)imide, n-propyl,methylpiperidinium bis((trifluoromethyl)sulfonyl)imide, 1,3-dioxane, 1,4-dioxane, 1,2-bis(cyanoethoxy)ethane, adiponitrile, fumaronitrile, succinonitrile, 1,3,5-pentanetricarbonitrile, 1,3,6-hexanetricarbonitrile, 1,2,3-tris(2-cyanoethoxy)propane or a fluoroacylhydroxylamine compound, wherein the fluoroacylhydroxylamine compound comprises the compound of Formula VII:

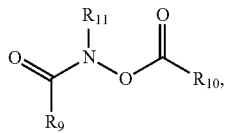

Formula VII wherein $R_9$ and $R_{10}$ are each independently selected from a hydrocarbyl group having 1-12 carbon atoms or a fluorohydrocarbyl group having 1-12 carbon atoms, $R_{11}$ is selected from a hydrogen atom or a hydrocarbyl group having 1-6 carbon atoms, and at least one of $R_9$ and $R_{10}$ is a fluorohydrocarbyl group having 1-12 carbon atoms;

wherein based on the weight of the electrolytic solution, the weight percentage of the additive is 0.05 wt % to 15 wt %.

20. The electronic device of claim 14, wherein the electrolytic solution further comprises an additive, the additive comprising at least one of the following compounds: vinylethylene carbonate, lithium bis(oxalate)borate, lithium borate difluoroxalate, lithium tetrafluoroborate, methylene methanedisulfonate, ethylene 4-trifluoromethyl carbonate, 1,3,2-dioxathiolane-2,2-dioxide, fluoroethylene carbonate, ethylene sulfite, vinylene carbonate, butanedioic anhydride, propylene sulfite, propenyl 1,3-sultone, bis(trimethylsilyl) sulfate, lithium nitrate, N-butyl, methylpyrrolidinium bis ((trifluoromethyl)sulfonyl)imide, n-propyl,methylpiperidinium bis((trifluoromethyl)sulfonyl)imide, 1,3-dioxane, 1,4-dioxane, 1,2-bis(cyanoethoxy)ethane, adiponitrile, fumaronitrile, succinonitrile, 1,3,5-pentanetricarbonitrile, 1,3,6-hexanetricarbonitrile, 1,2,3-tris(2-cyanoethoxy)propane or a fluoroacylhydroxylamine compound, wherein the fluoroacylhydroxylamine compound comprises the compound of Formula VII:

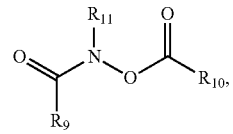

Formula VII wherein $R_9$ and $R_{10}$ are each independently selected from a hydrocarbyl group having 1-12 carbon atoms or a fluorohydrocarbyl group having 1-12 carbon atoms, $R_{11}$ is selected from a hydrogen atom or a hydrocarbyl group having 1-6 carbon atoms, and at least one of $R_9$ and $R_{10}$ is a fluorohydrocarbyl group having 1-12 carbon atoms;

wherein based on the weight of the electrolytic solution, the weight percentage of the additive is 0.05 wt % to 15 wt %.

* * * * *